No. 861,593. PATENTED JULY 30, 1907.
C. G. P. DE LAVAL.
PROCESS OF EXTRACTING IRON FROM ITS ORES.
APPLICATION FILED JULY 15, 1905.

Witnesses
N. W. Kuehne
A. J. McElhinney

Inventor
Carl Gustaf Patrik de Laval
By Richardson
Attorneys

UNITED STATES PATENT OFFICE.

CARL GUSTAF PATRIK DE LAVAL, OF STOCKHOLM, SWEDEN.

PROCESS OF EXTRACTING IRON FROM ITS ORES.

No. 861,593.

Specification of Letters Patent.

Patented July 30, 1907.

Application filed July 15, 1905. Serial No. 269,757.

*To all whom it may concern:*

Be it known that I, CARL GUSTAF PATRIK DE LAVAL, engineer and doctor of philosophy, subject of the King of Sweden, residing at Kungsträdgårdsgatan 2 C, Stockholm, Sweden, have invented new and useful Improvements in the Process of Extracting Iron from Its Ores, of which the following is a specification.

The present invention refers to an improvement in the process of extracting iron from its ores, and consists therein, that a pulverous charge of iron ore, carbon and other materials, necessary for carrying out the chemical reactions, is introduced continually and uniformly in or near the center of a furnace chamber, and is brought into a rapid rotation by means of a gas or air current, which by pressure or suction is introduced tangentially at the circumference of said furnace chamber and thus is brought into rotation. During said rotation the gas or air current is intimately mixed with the charge, which owing to the influence of the centrifugal force moves towards the circumference of the furnace chamber from its central inlet, whereas the gas or air current moves in a spiral direction from its circumferential inlet to its central outlet at the other end of the furnace. The charge and the gas or air current thus moves in opposite directions, whereby the chemical reactions between them are facilitated and rapidly carried out.

For making the invention fully understood the accompanying drawing shows a furnace for carrying out the above described method.

Figure 1:
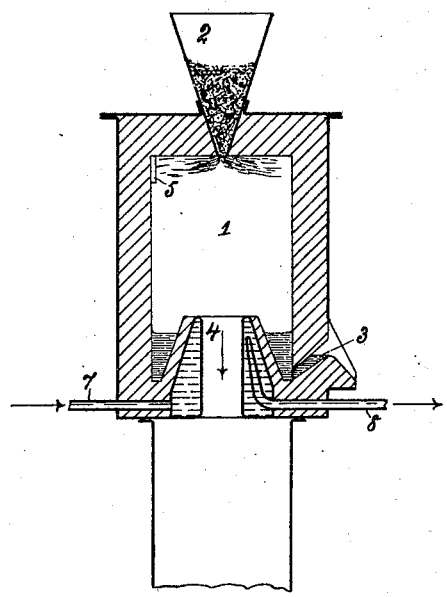
Figure 2:
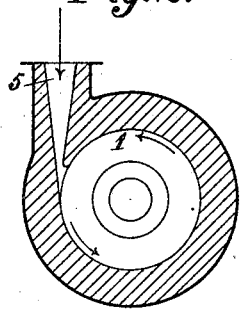

Figure 1 is a vertical section and Fig. 2 a horizontal section of the furnace.

1 indicates the furnace chamber which in the construction illustrated is cylindrical and provided at its upper end with a hopper 2 for the introduction of the pulverous charge. Arranged in the lower part of the furnace is an outlet 3 for the iron and a centrally arranged outlet 4 for the gases developed during the chemical reactions in the furnace.

Opening into the upper part of the furnace is the contracted mouth of a tangentially arranged pipe or nozzle 5 for air or gas. The air or gas is introduced into the furnace through the pipe 5 with great velocity by pressure or suction and owing to its tangential direction and the great velocity imparted to the air or gas in its inlet nozzle said air or gas will flow around the cylindrical wall of the furnace. The gas or air will be thus caused to rapidly whirl or rotate within the furnace carrying along with it the pulverous charge introduced through the hopper 2.

By means of any suitable device which however is no part of the present invention and is therefore not shown on the drawing, the introduction of the pulverous charge and the gas or air is made uniform and can be regulated. The charge preferably consists of iron ore, slag forming materials and carbon in a calculated proportion, said latter being burned to C O in the upper part of the furnace. The air or gas current, introduced through pipe 5, may consist of air alone or preferably of carbon monoxid or of air mixed with carbon in a proportion to form carbon monoxid within the furnace. The proportion of carbon, contained in the charge is correspondingly diminished in that latter case.

During the rotation, to which the charge owing to the air or gas current is subject, the charge moves by the centrifugal force towards the circumference of the furnace, during which motion the chemical reactions are carried out, so that slag and iron will gather on the furnace wall and flow to the lower part of the furnace, from which the iron is drawn off through the outlet 3.

As the outlet 4 for the gases is arranged centrally in the lower part of the furnace the gas or air introduced through the pipe 5 will move in a spiral direction from the circumference of the furnace to the outlet 4 in its central axial line. The charge and the gases, which will move chemically influence upon the same, thus will move in opposite directions, whereby they are better mixed with one another and the chemical reactions facilitated and rapidly carried out.

The outlet 4 is as shown arranged as a twyer, having a hollow wall and is cooled by means of a water current circulating through the pipes 7 and 8. This arrangement of outlet is provided in order to avoid obstruction by dust following the gases, such dust having less tendency to adhere to the surfaces of the twyer when water cooled.

Having now particularly described and ascertained the nature of the said invention and in what manner the same is to be performed I declare that what I claim is:—

1. The process of extracting iron from its ores which consists in introducing a pulverous charge, containing iron ore mixed with materials necessary for carrying out the chemical reactions, into the rotating body of a gas current moving in an opposite radial direction to the charge.

2. The process of extracting iron from its ores, which consists in introducing a pulverous charge, containing iron ore, into the rotating body of an air current, mixed with carbon sufficient to form carbon monoxid, and moving in an opposite radial direction to the charge.

In testimony whereof I have signed my name to this specification in the presence of two subscribing witnesses.

CARL GUSTAF PATRIK DE LAVAL.

Witnesses:
WALDEMAR BOMAN,
CARL FRIBERG.